(12) United States Patent
Terry et al.

(10) Patent No.: US 6,841,630 B2
(45) Date of Patent: Jan. 11, 2005

(54) PROCESSES FOR TRANSITIONING BETWEEN CHROME-BASED AND MIXED POLYMERIZATION CATALYSTS

(75) Inventors: Kersten Anne Terry, Charleston, WV (US); Mark Gregory Goode, Hurricane, WV (US); Daniel E. Wente, Houston, TX (US); John Chirillo, Jr., Friendswood, TX (US); Simon Mawson, Orlando, FL (US); Jose Fernando Cevallos-Candau, Charleton, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/715,651

(22) Filed: Nov. 17, 2003

(65) Prior Publication Data

US 2004/0143076 A1 Jul. 22, 2004

Related U.S. Application Data

(60) Provisional application No. 60/437,204, filed on Dec. 31, 2002.

(51) Int. Cl.$^7$ .................................................. C08F 2/34
(52) U.S. Cl. ............................ 526/73; 526/82; 526/84; 526/86; 526/901
(58) Field of Search ............................ 526/73, 82, 84, 526/86, 901

(56) References Cited

U.S. PATENT DOCUMENTS

| 4,306,044 | A | | 12/1981 | Charsley ...................... 526/84 |
|---|---|---|---|---|
| 4,460,755 | A | * | 7/1984 | Williams et al. .............. 526/84 |
| 4,834,947 | A | | 5/1989 | Cook et al. .................. 422/117 |
| 5,227,438 | A | | 7/1993 | Rebhan ........................ 526/82 |
| 5,270,408 | A | | 12/1993 | Craddock, III et al. ....... 526/82 |
| 5,371,053 | A | | 12/1994 | Agapiou et al. .............. 502/56 |
| 5,442,019 | A | | 8/1995 | Agapiou et al. .............. 526/82 |
| 5,672,665 | A | | 9/1997 | Agapiou et al. .............. 526/82 |
| 5,753,786 | A | | 5/1998 | Agapiou et al. .............. 526/82 |
| 6,284,849 | B1 | | 9/2001 | Almquist et al. ............. 526/82 |
| 6,359,084 | B1 | | 3/2002 | Herzog et al. ................ 526/84 |
| 6,388,027 | B1 | * | 5/2002 | Zilker et al. .................. 526/82 |
| 2003/0114609 | A1 | * | 6/2003 | Samson ....................... 526/86 |

FOREIGN PATENT DOCUMENTS

| EP | 0116917 A1 | 8/1984 |
|---|---|---|
| EP | 0471479 B1 | 2/1992 |
| EP | 0829491 A2 | 3/1998 |
| WO | WO 92/14766 | 9/1992 |
| WO | WO 98/30599 | 7/1998 |

* cited by examiner

Primary Examiner—Fred Teskin
(74) Attorney, Agent, or Firm—Kevin M. Faulkner

(57) ABSTRACT

Processes for transitioning among polymerization catalyst systems, preferably catalyst systems, which are incompatible with each other. Particularly, processes for transitioning among olefin polymerization reactions utilizing silyl-chromate catalyst systems and metallocene catalyst systems.

19 Claims, No Drawings

PROCESSES FOR TRANSITIONING BETWEEN CHROME-BASED AND MIXED POLYMERIZATION CATALYSTS

This application claims the benefit of Provisional Application No. 60/437,204, filed Dec. 31, 2002.

FIELD OF THE INVENTION

This invention relates to processes for transitioning between polymerization catalyst systems, especially catalyst systems that are incompatible with each other. More particularly, the invention relates to processes for transitioning from olefin polymerization reactions utilizing chromium-based catalyst systems to olefin polymerizations utilizing metallocene/Ziegler-Natta mixed catalyst systems and vice-versa.

BACKGROUND OF THE INVENTION

During the production of olefin polymers in a commercial reactor it is often necessary to transition from one type of catalyst system producing polymers having certain properties and characteristics to another catalyst system capable of producing polymers of different chemical and/or physical attributes. Transitioning between similar catalyst systems, or compatible catalyst systems, for instance, generally takes place easily. However, where the catalyst systems are of different types or are otherwise incompatible, the process is typically complicated. For example, transitioning from a chromium-based catalyst to a metallocene catalyst, or vice versa, normally requires a long transition period. In addition, the polyolefins produced during this transition period will continuously change in properties resulting in off-grade products. If the transition from one catalyst system to another requires substantial changes in reactor conditions, the risks of encountering production problems and producing polymers having extreme properties are increased.

When a polymerization reaction catalyzed by a first catalyst is to be changed to a polymerization reaction catalyzed by a second catalyst wherein the second catalyst is incompatible with the first catalyst, several methods of performing the transition are possible. One possibility is to kill the existing polymerization reaction, empty the reactor, recharge and start again with a new catalyst. The benefit of this procedure is that the amount of remaining material in the plant from the previous run will be small. The disadvantages of this procedure are that it takes several hours to build up a desired level of solids inside the reactor and traces of material from the first polymerization reaction remain in the reactor since it is practically impossible to completely remove such material.

Another possibility is to make a running transition where the change from one type of produced polymer to another is continuous, that is without interrupting the polymerization reaction. When transitioning from a first to a second catalyst, the initial step is to discontinue the catalyst feed. The new catalyst is then introduced and, if necessary, the reactor conditions are adapted to the conditions required by the new catalyst.

U.S. Pat. No. 6,284,849 to Almquist et al. discloses a method for transitioning between a chromium-based catalyst and a metallocene. The examples therein utilize Phillips type chromium-based catalysts and bisCp metallocenes. So-called Phillips type chromium-based catalysts are chromium oxide-on-silica catalysts. The catalysts are formed by impregnating a $Cr^{+3}$ species into silica, followed by fluidization of the silica matrix at ca. 400° C.–900° C. wherein $Cr^{+3}$ is converted to $Cr^{+6}$. The Phillips type chromium-based catalyst is also commonly referred to in the prior art as "inorganic oxide-supported $Cr^{+6}$".

It would be highly advantageous to have a process for transitioning between different or incompatible catalyst systems, without the need for halting the polymerization reaction, emptying the reactor to rid it of the original catalyst system and restarting the polymerization reaction with another catalyst system. In addition, it would be advantageous if the process for transitioning could reduce the amount of off-grade material produced during the transition process, reduce the transition time, increase the robustness and stability of the transition process and avoid the need to open the reactor to charge the seed bed.

SUMMARY OF THE INVENTION

The invention is drawn to processes for transitioning between at least two catalysts and/or catalyst systems in a polymerization process.

According to a preferred embodiment, the polymerization process is conducted by the essentially continuous passage of monomer gases through the polymerization zone of a gas phase fluidized bed reactor that contains a fluidized bed of polymer particles. According to this embodiment, the process for transitioning from a first polymerization reaction conducted in the presence of a chrome-based catalyst system to a second polymerization reaction conducted in the presence of a mixed metallocene/Ziegler-Natta catalyst system comprises:

a) discontinuing the introduction of the chrome-based catalyst system into the reactor and allowing reactor temperature to drop to or below 80° C.;

b) maintaining polymerization conditions in the reactor and permitting polymerization to continue for a period of time to allow the components of the chrome-based catalyst system present in the reactor to produce additional polymer particles;

c) except for reactor temperature, establishing target conditions within the reactor for the product to be produced with the mixed metallocene/Ziegler-Natta catalyst system;

d) introducing the mixed catalyst system into the reactor;

e) increasing reactor temperature to about 105° C., preferably to a temperature in the range of from about 95° C. to about 110° C., more preferably from about 99° C. to about 109° C. essentially simultaneously with the commencement of the second polymerization reaction catalyzed by the mixed catalyst system and maintaining the temperature in that range until reactor operability is assured; and f) substantially maintaining reactor temperature and conditions until operability is assured and thereafter proceeding to normal operations.

According to a preferred embodiment, the chrome-based catalyst system is a silyl-chromate catalyst system.

According to another preferred embodiment, the polymerization processes include introducing a poison or behavior modifier for the chrome-based catalyst system to inhibit the first polymerization reaction. According to this process, the following steps are also performed:

the partial pressure of ethylene in the reactor is reduced to about 60 to about 85 psig; and the reactor is purged with ethylene to achieve at least five gas volume change outs of the reactor.

According to yet another preferred embodiment, the polymerization process is conducted by the essentially continuous passage of monomer gases through the polymerization zone of a gas phase fluidized bed reactor that contains a fluidized bed of polymer particles. According to this embodiment, the process for transitioning from a first polymerization reaction conducted in the presence of a mixed metallocene/Ziegler-Natta catalyst system to a second polymerization reaction conducted in the presence of a chrome-based catalyst system comprises:

a) discontinuing the introduction of the mixed catalyst system into the reactor and allowing reactor temperature to drop to or below 80° C.;

b) maintaining polymerization conditions in the reactor and permitting polymerization to continue for a period of time to allow the components of the mixed catalyst system present in the reactor to produce additional polymer particles;

c) except for reactor temperature, establishing target conditions within the reactor for the product to be produced using the chrome-based catalyst system;

d) introducing the chrome-based catalyst system into the reactor;

e) increasing reactor temperature to a temperature equal to or less than 105° C., preferably a temperature in the range of from about 90° C. to about 105° C., more preferably in the range of from about 93° C. to about 102° C. and maintaining the temperature in that range until reactor operability is assured; and f) substantially maintaining reactor temperature and conditions until operability is assured and thereafter proceeding to normal operations.

DETAILED DESCRIPTION OF THE INVENTION

The present invention relates to processes for transitioning between catalysts and/or catalyst systems to convert a reactor from producing one type of product to another with minimal reactor down-time. For the purposes of this patent specification and appended claims the terms "catalyst" and "catalyst system" shall be used interchangeably and shall have the identical meaning. The term "running transition" as used herein means maintaining polymerization conditions in the reactor and permitting polymerization to continue during a transition, from commencement thereof to completion thereof wherein normal operations are established or re-established.

According to a preferred embodiment, the process is one for transitioning from a first polymerization reaction conducted in the presence of a first catalyst system to a second polymerization reaction conducted in the presence of a second catalyst system wherein the first and second catalyst systems are incompatible.

Compatible catalysts are those catalysts having similar kinetics of termination and insertion of monomer and comonomer(s) and/or do not detrimentally interact with each other.

For the purposes of this patent specification and appended claims the term "incompatible catalysts" shall refer to and mean catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%.

In particular, preferred processes are drawn to transitioning between chrome-based catalysts/catalyst systems and mixed metallocene/Ziegler-Natta catalysts/catalyst systems. It is contemplated that the transition between such incompatible catalysts may be from a chrome-based catalyst system to a mixed metallocene/Ziegler-Natta catalyst or from a mixed metallocene/Ziegler-Natta catalyst to a chrome-based catalyst system.

The processes preferably are used in gas phase, solution phase, slurry or bulk phase polymerization processes. Most preferably, the processes are used in a gas phase polymerization process in a fluidized bed reactor.

In a typical continuous gas phase fluidized bed polymerization process for the production of polymer from monomer, a gaseous stream comprising monomer is passed through a fluidized bed reactor in the presence of a catalyst under reactive conditions. A polymer product is withdrawn from the fluidized bed reactor. Also withdrawn from the reactor is a cycle gas stream, which is continuously circulated and usually cooled. The cycle gas stream is returned to the reactor together with additional monomer sufficient to replace the monomer consumed in the polymerization reaction. For detailed descriptions of gas phase fluidized bed polymerization processes, see U.S. Pat. Nos. 4,543,399, 4,588,790, 5,028,670, 5,352,769 and 5,405,922, the disclosures of which are hereby fully incorporated herein by reference.

For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2–15 carbon atoms, for example, ethylene, propylene, butene-1, pentene-1,4-methylpentene-1, hexene-1, octene-1, decene-1 and cyclic olefins such as styrene. Other monomers can include polar vinyl, dienes, norborene, acetylene and aldehyde monomers. In the preferred embodiments of the present invention, the gas composition contains ethylene and at least one alpha-olefin having 3 to 15 carbon atoms.

Typically, the gas composition also contains an amount of hydrogen to control the melt index of the polymer to be produced. In typical circumstances the gas also contains an amount of a dew point increasing or inducing component, for example, isopentane, with the balance of the gas composition made up of non-condensable inerts, for example, nitrogen.

Depending on the second catalyst to be introduced into the reactor, the gas composition, such as the comonomer and hydrogen gas concentrations, can be increased or decreased.

The specific reactor conditions depend, for example, on catalyst activity, type and amount of comonomer, type of polymer to be produced, and the production equipment. Consequently, the specific conditions that exist in the reactor during a transition between chromium and metallocene catalysts have to be determined for each specific product in a particular plant. However, in general the reactor conditions when using metallocene catalysts include a reduced feed of comonomer because the comonomers are much more uniformly incorporated in metallocene catalyzed polymers than in chromium catalyzed polymers of equal polymer density. The melt flow index can be adjusted by introducing hydrogen, and also, to a certain degree, ethylene. With metallocene catalysts the changes in reactor parameters give a much faster response than with chrome-based catalysts.

According to a preferred embodiment, the process involves a running transition from a steady-state operation with a chrome-based catalyst system to a steady-state operation with a mixed metallocene/Ziegler-Natta catalyst system. Most preferably, the chrome-based catalyst system is a silyl-chromate catalyst system. According to this process, the production of polymer according to the chrome-based catalyst system is terminated by stopping the introduction of the chrome-based catalyst system into the reactor. The appropriate reactor conditions for the chrome-based catalyzed reaction are maintained for a period of about 4 to 6 hours so as to allow as much as possible of the chrome-based catalyst system to react and be consumed.

Hydrogen gas ($H_2$) is typically added to chrome catalyzed reactions to tailor the molecular weight of the polymer product. If present, the $H_2$ must be removed as completely as possible before the transition to the metallocene/Ziegler-Natta mixed catalyst is begun. The $H_2$ can be removed by purging during the transition to metallocene or it can be eliminated from the gas composition early so the concentration can decrease naturally to avoid the need to purge the reactor.

Once any residual $H_2$ has been removed or reduced to acceptable levels, the appropriate conditions for the metallocene/Ziegler-Natta mixed catalyst can be built within the reactor. Once the appropriate conditions are achieved, the metallocene/Ziegler-Natta mixed catalyst feed is begun. Once the metallocene/Ziegler-Natta mixed catalyst reaction begins, the reaction temperature within the reactor is increased to about 105° C., preferably to a temperature in the range of from 95° C. to about 110° C., more preferably from about 99° C. to about 109 until reactor operability achieved. Increasing the temperature inhibits or prevents the production of low flow index (FI) material with any chrome-based catalyst, especially silyl-chromate catalyst, remaining in the reactor as chrome-based catalysts have been found to be very sensitive to reactor temperatures. Conversely, when transitioning from the mixed catalyst system to a chromium-based catalyst system, the reactor temperature should be maintained at or below 105° C., preferably at a temperature in the range of from about 90° C. to about 105° C., more preferably in the range of from about 93° C. to about 102° C. until reactor operability is achieved and assured.

While a running transition can be performed without the use of a deactivating agent, in a preferred embodiment, the chrome-based catalyst system is deactivated before commencing the introduction of the mixed metallocene/Ziegler-Natta catalyst system and vice-versa. In general, such a transition procedure is started by discontinuing the feed of the chrome-based catalyst system and then introducing a deactivating agent into the reaction medium to kill or inhibit the catalytic activity of the chrome-based catalyst system. During the transition, all catalytic components involved will become exposed to the same reaction medium. Consequently, the agent intended to deactivate the chrome-based catalyst system will also come into contact with the mixed metallocene/Ziegler-Natta catalyst system and preferably does not adversely affect the activity of the mixed system. For chrome-based catalyst systems, especially silyl-chromate catalysts, a suitable deactivating agent can be selected from the group of polar hydrocarbons, such as, for example, alcohols, glycols, phenols, ethers, ketones, aldehydes, and carboxylic acids. However, preferably, oxygen is used to deactivate the chrome-based catalyst. Those skilled in the art will recognize that the deactivating agent is preferably one that will kill or deactivate the chrome-based catalyst system but will have no or minimal adverse effect on the mixed catalyst system. Those skilled in the art will also recognize that another compound can be introduced into the reactor that reacts with the remaining components of the catalyst deactivator to prevent the mixed catalyst system from being deactivated.

Once the chrome-based catalyst system has been deactivated, the partial pressure of ethylene in the reactor is reduced to about 60 to about 85 psig and the reactor is purged with ethylene to achieve at least five gas volume change outs of the reactor. After purging the reactor with ethylene, the appropriate conditions for the metallocene catalyst are built within the reactor. Similar to the process described above, once the appropriate conditions are achieved, the mixed catalyst feed is begun and once the mixed metallocene/Ziegler-Natta catalyzed reaction begins, the reaction temperature within the reactor is increased to about about 105° C., preferably to a temperature in the range of from 95° C. to about 110° C., more preferably from about 99° C. to about 109 until reactor operability achieved.

According to another preferred embodiment, the process involves a running transition from a steady-state operation with a mixed catalyst system to a steady-state operation with a chrome-based catalyst system. According to this process, the production of polymer according to the metallocene catalyst system is terminated by stopping the introduction of the metallocene catalyst system into the reactor. The appropriate reactor conditions for the metallocene catalyzed reaction are maintained for a period of about 2 to 8 hours so as to allow as much as possible of the metallocene catalyst to react and be consumed.

Next, the appropriate conditions for the chrome-based catalyst are built within the reactor. Once the appropriate conditions are achieved, the chrome-based catalyst feed is begun. Once the chrome-based catalyzed reaction begins, the reaction temperature within the reactor is increased to about 95° C., preferably to a temperature in the range of from about 90° C. to about 105° C., more preferably in the range of from about 93° C. to about 102° C. until reactor operability is assured.

To the extent the present invention pertains to transitioning from chrome-based catalyst systems to mixed metallocene/Ziegler-Natta catalyst systems and vice-versa, all olefin polymerization catalysts including chrome catalysts, conventional-type Ziegler-Natta transition metal catalysts and bulky ligand metallocene-type catalysts are suitable for use in the processes of the present invention. Also, the mixed catalyst system useful in the present invention comprising metallocene and at least one other active compound, including a second metallocene component. Suitable mixed catalyst systems are disclosed in U.S. application Ser. No. 60/408,430, entitled Bimodal Polyolefin Production Process, filed Sep. 4, 2002, which is incorporated herein by reference. Nonetheless, the following is a non-limiting discussion of the various polymerization catalysts and catalyst components useful in the present invention.

Chrome-Based Catalyst Systems

Chrome-based catalyst compounds suitable for use in the present invention include $CrO_3$, chromocene, silyl chromate, chromyl chloride ($CrO_2Cl_2$), and the like. Non-limiting examples are disclosed in U.S. Pat. Nos. 3,709,853, 3,709,954, 3,231,550, 3,242,099 and 4,077,904, the disclosures of which are hereby fully incorporated herein by reference. Other non-limiting examples are discussed in U.S. Pat. Nos. 4,152,502, 4,115,639, 4,077,904, 4,482,687, 4,564,605, 4,721,763, 4,879,359 and 4,960,741, the disclosures of which are hereby fully incorporated herein by reference.

Chrome-based catalyst systems may comprise an additional metal such as where the carrier material (e.g. silica) for the chrome-based catalyst is co-impregnated with, for example, a titanium compound such as titanium tetra-isopropoxide. Such systems are referred to herein as mixed chrome/ Ziegler-Natta catalysts systems and such systems are suitable for use in the present invention for transitioning from as the first catalyst systems or for transitioning to as the second catalyst systems. Preferred chrome-based catalyst compounds are chromate compounds and silyl chromate catalyst systems are particularly preferred for use in the present invention.

Conventional-Type Transition Metal Catalysts

Conventional-type Ziegler-Natta transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Groups 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, the disclosures of which are hereby fully incorporated herein by reference. The $MgTiCl_6$ (ethyl acetate)$_4$ derivative is particularly preferred.

British Patent Application No. 2,105,355 and U.S. Pat. No. 5,317,036, the disclosures of which are hereby incorporated herein by reference, describe various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where "Bu" means "butyl" and $VO(OC_2H_5)_3$; vanadium tetra-halide and vanadium alkoxy halides such as $VCl_4$ and $VCl_3$ (OBu); vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR, where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, and naphthyl and vanadium acetyl acetonates.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, the disclosures of which are hereby fully incorporated herein by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437, the disclosures of which are hereby fully incorporated herein by reference.

Typically, these conventional-type transition metal catalyst compounds and some chrome-based catalyst systems are activated with one or more of the conventional-type cocatalysts described below.

Conventional-Type Cocatalysts

Conventional-type cocatalyst compounds for the above conventional-type transition metal catalyst compounds (as well as for the some chrome-based systems) may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and triisobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, the disclosures of which are hereby fully incorporated herein by reference.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B M Q_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of t-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene-type catalyst compound.

In one embodiment, the bulky ligand metallocene-type catalyst compounds of the invention include those of formula (I) where $L^A$ and $L^B$ are bridged to each other by a bridging group, A, such that the formula is represented by

$$L^A A L^B M Q_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by $R'_2C$, $R'_2Si$, $R'_2SiR'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalyst compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

4) $L^C A J M Q_n$  (III)

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (II) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably, J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$L^D M Q_2 (YZ) X_n$  (IV)

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$ (YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 the disclosures of which are hereby incorporated herein by reference.

In another embodiment, the bulky ligand metallocene-type catalyst compounds are those complexes known as transition metal catalysts based on bidentate ligands containing pyridine or quinoline moieties, such as those described in U.S. Pat. No. 6,103,357, the disclosure of which is hereby incorporated herein by reference. In another embodiment, the bulky ligand metallocene-type catalyst compounds are those described in PCT publications WO 99/01481 and WO 98/42664, the disclosures of which are hereby fully incorporated herein by reference.

In one embodiment, the bulky ligand metallocene-type catalyst compound is represented by the formula:

$((Z)XA_t(YJ))_q M Q_n$  (V)

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene-Type Catalyst Compounds

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", *J. Am. Chem. Soc.*, 1995, 117, pp. 6414–6415 and Johnson, et al., "Copolymerization of Ethylene and Propylene with Functionalized Vinyl Monomers by Palladium(II) Catalysts", *J. Am. Chem. Soc.*, 1996, 118, pp. 267–268, and WO 96/23010, WO 99/02472, U.S. Pat. Nos. 5,852,145, 5,866,663 and 5,880,241, the disclosures of which are hereby fully incorporated herein by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et al., *Chem. Comm.*, pp. 849–850 (1998), the disclosures of which are hereby incorporated herein by reference.

Other bulky ligand metallocene-type catalysts are those Group S and 6 metal imido complexes described in EP-A2-0 816 384 and U.S. Pat. No. 5,851,945, the disclosures of which are hereby incorporated herein by reference. In addition, bulky ligand metallocene-type catalysts include bridged bis(arylamido) Group 4 compounds described by D. H. McConville, et al., *Organometallics*, 1195, 14, pp. 5478–5480, the disclosure of which is hereby incorporated herein by reference. Other bulky ligand metallocene-type catalysts are described as bis(hydroxy aromatic nitrogen ligands) in U.S. Pat. No. 5,852,146, the disclosure of which is hereby incorporated herein by reference. Other metallocene-type catalysts containing one or more Group 15 atoms include those described in WO 98/46651, the disclosure of which is hereby incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, the disclosure of which is hereby incorporated herein by reference) and mixtures thereof.

Metallocene Activators

As used herein, the term "activator" is defined to be any compound or combination of compounds, supported or unsupported, which can activate a single-site catalyst compound (e.g., metallocenes, Group 15-containing catalysts, etc.), such as by creating a cationic species from the catalyst component. Typically, this involves the abstraction of at least one leaving group (X group in the formulas/structures above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides) and so called non-coordinating ionic activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis (pentafluorophenyl)boron and/or a trisperfluorophenyl boron metalloid precursors to activate desirable metallocenes described herein. MAO and other aluminum-based activators are well known in the art. Ionizing activators are well known in the art and are described by, for example, Eugene You-Xian Chen & Tobin J. Marks, "Cocatalysts for Metal-Catalyzed Olefin Polymerization: Activators, Activation Processes, and Structure-Activity Relationships", 100 (4) CHEMICAL REVIEWS, pp. 1391–1434 (2000), the disclosure of which is incorporated herein by reference. The activators may be associated with or bound to a support, either in association with the catalyst component (e.g., metallocene) or separate from the catalyst component, such as described by Gregory G. Hlatky, "Heterogeneous Single-Site Catalysts for Olefin Polymerization" 100(4) CHEMICAL REVIEWS 1347–1374 (2000), the disclosure of which is incorporated herein by reference.

Non-limiting examples of aluminum alkyl compounds which may be utilized as activators for the catalyst precursor compounds for use in the methods of the present invention include trimethylaluminum, triethylaluminum, triisobutylaluminum, tri-n-hexylaluminum, tri-n-octylaluminum and the like.

Examples of neutral ionizing activators include Group 13 tri-substituted compounds, in particular, tri-substituted boron, tellurium, aluminum, gallium and indium compounds, and mixtures thereof. The three substituent groups are each independently selected from alkyls, alkenyls, halogen, substituted alkyls, aryls, arylhalides, alkoxy and halides. In one embodiment, the three groups are independently selected from halogen, mono or multicyclic (including halosubstituted) aryls, alkyls, and alkenyl compounds and mixtures thereof. In another embodiment, the three groups are selected from alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from alkyls having 1 to 4 carbon groups, phenyl, naphthyl and mixtures thereof. In yet another embodiment, the three groups are selected from highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

In another embodiment, the neutral tri-substituted Group 13 compounds are boron compounds such as a trisperfluorophenyl boron, trisperfluoronaphthyl boron, tris(3,5-di(trifluoromethyl)phenyl)boron, tris(di-t-butylmethylsilyl) perfluorophenylboron, and other highly fluorinated trisarylboron compounds and combinations thereof, and their aluminum equivalents. Other suitable neutral ionizing activators are described in U.S. Pat. No. 6,399,532 B1, U.S. Pat. No. 6,268,445 B1, and in 19 ORGANOMETALLICS pp. 3332–3337 (2000) in 17 ORGANOMETALLICS pp. 3996–4003 (1998), the disclosures of which are incorporated herein by reference.

Illustrative, not limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl) boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra(phenyl)boron, tri(dimethylphenyl)phosphonium tetra(phenyl)boron and the like, and their aluminum equivalents.

In yet another embodiment, an alkylaluminum can be used in conjunction with a heterocyclic compound. The ring of the heterocyclic compound may includes at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from chlorine, bromine and fluorine, and selected from fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5, dimethyl pyrroles, 3-pentafluorophenyl pyrrole, 4,5,6,7 tetrafluoroindole or 3,4 difluoropyrroles.

In one embodiment, the heterocyclic compound described above is combined with an alkyl aluminum or an alumoxane to yield an activator compound which, upon reaction with a catalyst component, for example a metallocene, produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515, the disclosure of which is incorporated herein by reference, such as tris (2,2',2"-nonafluorobiphenyl) fluoroaluminate. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate) .4THF; silylium salts in combination with a non-coordinating compatible anion. Also, methods of activation such as using radiation, electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and WO 98/32775, the disclosures of which are incorporated herein by reference.

In general, the activator and catalyst component(s) are combined in mole ratios of activator to catalyst component from 1000:1 to 0.1:1, and from 300:1 to 1:1 in another embodiment, and from 150:1 to 1:1 in yet another embodiment, and from 50:1 to 1:1 in yet another embodiment, and from 10:1 to 0.5:1 in yet another embodiment, and from 3:1 to 0.3:1 in yet another embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet another embodiment.

Support

A support may also be present as part of the catalyst system used in the present invention. Supports, methods of supporting, modifying, and activating supports for single-site catalyst such as metallocenes is discussed in, for example, 1 METALLOCENE-BASED POLYOLEFINS 173–218 (J. Scheirs & W. Kaminsky eds., John Wiley & Sons, Ltd. 2000), the disclosure of which is incorporated herein by reference. The terms "support" or "carrier", as used herein, are used interchangeably and refer to any support material, a porous support material in one embodiment, including inorganic or organic support materials. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

The support may be contacted with the other components of the catalyst system in any number of ways. In one embodiment, the support is contacted with the activator to form an association between the activator and support, or a "bound activator". In another embodiment, the catalyst component may be contacted with the support to form a "bound catalyst component". In yet another embodiment, the support may be contacted with the activator and catalyst component together, or with each partially in any order. The components may be contacted by any suitable means as in a solution, slurry, or solid form, or some combination thereof, and may be heated when contacted to from 25° C. to 250° C.

Desirable carriers are inorganic oxides that include Group 2, 3, 4, 5, 13 and 14 oxides and chlorides. Support materials include silica, alumina, silica-alumina, magnesium chloride, graphite, and mixtures thereof in one embodiment. Other useful supports include magnesia, titania, zirconia, montmorillonite (EP 0 511 665 B1, the disclosure of which is incorporated herein by reference), phyllosilicate, and the like. Also, combinations of these support materials may be used, for example, silica-chromium, silica-alumina, silica-titania and the like. Additional support materials may include those porous acrylic polymers described in EP 0 767 184 B1, the disclosure of which is incorporated herein by reference.

In one aspect of the support useful in the invention, the support possess a surface area in the range of from 10 to 700 $m^2/g$, pore volume in the range of from 0.1 to 4.0 $cm^3/g$ and average particle size in the range of from 5 to 500 $\mu m$. In another embodiment, the surface area of the carrier is in the range of from 50 to 500 $m^2/g$, pore volume of from 0.5 to 3.5 $cm^3/g$ and average particle size of from 10 to 200 $\mu m$. In yet another embodiment, the surface area of the carrier is in the range is from 100 to 400 $m^2/g$, pore volume from 0.8 to 3.0 $cm^3/g$ and average particle size is from 5 to 100 $\mu m$. The average pore size of the carrier of the invention typically has pore size in the range of from 10 to 1000 Å, from 50 to 500 Å in another embodiment, and from 75 to 350 Å in yet another embodiment.

In one embodiment of the support, graphite is used as the support. The graphite is a powder in one embodiment. In another embodiment, the graphite is flake graphite. In another embodiment, the graphite and has a particle size of from 1 to 500 microns, from 1 to 400 microns in another embodiment, and from 1 to 200 in yet another embodiment, and from 1 to 100 microns in yet another embodiment.

The support, especially an inorganic support or graphite support, may be pretreated such as by a halogenation process or other suitable process that, for example, associates a chemical species with the support either through chemical bonding, ionic interactions, or other physical or chemical interaction. In one embodiment, the support is fluorided. The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$.

A desirable method of treating the support with the fluorine compound is to dry mix the two components by simply blending at a concentration of from 0.01 to 10.0 millimole F/g of support in one embodiment, and in the range of from 0.05 to 6.0 millimole F/g of support in another embodiment, and in the range of from 0.1 to 3.0 millimole F/g of support in yet another embodiment. The fluorine compound can be dry mixed with the support either before or after charging to the vessel for dehydration or calcining the support. Accordingly, the fluorine concentration present on the support is in the range of from 0.2 to 5 wt % in one embodiment, and from 0.6 to 3.5 wt % of support in another embodiment.

Another method of treating the support with the fluorine compound is to dissolve the fluorine in a solvent, such as water, and then contact the support with the fluorine containing solution (at the concentration ranges described herein). When water is used and silica is the support, it is desirable to use a quantity of water that is less than the total pore volume of the support. Desirably, the support and, for example, fluorine compounds are contacted by any suitable means such as by dry mixing or slurry mixing at a temperature of from 100° C. to 1000° C. in one embodiment, and from 200° C. to 800° C. in another embodiment, and from 300° C. to 600° C. in yet another embodiment, the contacting in any case taking place for between two to eight hours.

Dehydration or calcining of the support may or may also be carried out. In one embodiment, the support is calcined prior to reaction with the fluorine or other support-modifying compound. In another embodiment, the support is calcined and used without further modification, or calcined, followed by contacting with one or more activators and/or catalyst components. Suitable calcining temperatures range from 100° C. to 1000° C. in one embodiment, and from 300° C. to 900° C. in another embodiment, and from 400° C. to 850° C. in yet a more particular embodiment. Calcining may take place in the absence of oxygen and moisture by using, for example, an atmosphere of dry nitrogen.

It is within the scope of the present invention to co-contact (or "co-immobilize") more than one catalyst component with a support. Non-limiting examples of co-immobilization of catalyst components include two or more of the same or different metallocene catalyst components, one or more metallocene with a Ziegler-Natta type catalyst, one or more metallocene with a chromium or "Phillips" type catalyst, one or more metallocenes with a Group 15 containing catalyst, and any of these combinations with one or more activators. More particularly, co-supported combinations include metallocene A/metallocene A; metallocene A/metallocene B; metallocene/Ziegler Natta; metallocene/Group 15 containing catalyst; metallocene/chromium catalyst; metallocene/Ziegler Natta/Group 15 containing catalyst; metallocene/chromium catalyst/Group 15 containing catalyst, any of the these with an activator, and combinations thereof.

Further, the catalyst system of the present invention can include any combination of activators and catalyst components, either supported or not supported, in any number of ways. For example, the catalyst component may include any one or both of metallocenes and/or Group 15 containing catalysts components, and may include any combination of activators, any of which may be supported by any number of supports as described herein. Non-limiting examples of catalyst system combinations useful in the present invention include MN+NCA; MN:S+NCA; NCA:S+MN; MN:NCA:S; MN+AlA; MN:S+AlA; AlA:S+

MN; MN:AlA:S; AlA:S+NCA+MN; NCA:S+MN+AlA; G15+NCA; G15:S+NCA; NCA:S+G15; G15:NCA:S; G15+ AlA; G15:S+AlA; AlA:S+G15; G15:AlA:S; AlA:S+NCA+ G15; NCA:S+G15+AlA; MN+NCA+G15; MN:S+NCA+ G15; NCA:S+MN+G15; MN:NCA:S+G15; MN+G15+ AlA; MN:S+AlA+G15; AlA:S+MN+G15; MN:AlA:S+ G15; AlA:S+NCA+MN+G15; NCA:S+MN+AlA+G15; MN+NCA; G15:MN:S+NCA; G15:NCA:S+MN; G15:MN:NCA:S; G15:MN:S+AlA; G15:AlA:S+MN; G15:MN:AlA:S; G15:AlA:S+NCA+MN; G15:NCA:S+ MN+AlA; wherein "MN" is metallocene component, "NCA" is a non-coordinating activator including ionic and neutral boron and aluminum based compounds as described above, "AlA" is an aluminum alkyl and/or alumoxane based activator, "G15" is a Group 15 containing catalyst component as described above, and "S" is a support; and wherein the use of ":" with "S" means that that those groups next to the colon are associated with ("supported by") the support as by pretreatment and other techniques known in the art, and the "+" sign means that the additional component is not directly bound to the support but present with the support and species bound to the support, such as present in a slurry, solution, gas phase, or another way, but is not meant to be limited to species that have no physico-chemical interaction with the support and/or supported species. Thus, for example, the embodiment "MN:NCA:S+G15" means that a metallocene and NCA activator are bound to a support, and present in, for example, a gas phase polymerization with a Group 15 containing catalyst component.

In order to provide a better understanding of the present invention, the following examples are offered as related to actual tests performed in the practice of this invention.

EXAMPLE 1

Reactor and Equipment

The following example was conducted in a fluidized bed reactor starting with a silylchromate-on-silica catalyst system with a running transition to an mixed catalyst system comprising a metallocene, ammonia and phosphorus.

Experimental indicators of operability problems utilize the measurement of temperatures which exist at the wall of the reactor. The temperature was measured using thermocouples known in the art as "skin thermocouples" since they measure temperature close to the reactor wall. Typically, the skin thermocouples are 5°–10° F. (1°–4° C.) below the internal bed temperature. Deviations from the baseline are indicative of reactor operability problems. These deviations can be either positive or negative.

Positive skin thermocouple deviations are the result of reactor sheeting due to a run away reaction at the wall of the reactor. If the internal bed temperature increases to the point at which the melting point of the polymer is attained, a solid strip of polymer is formed and dislodged to the main body of the reactor resulting in severe operability problems. In many cases; several hours to days of a reactor shut down are required to remove the sheets before restarting the polymerization process.

Negative skin thermocouple deviations are less serious since this is representative of "cold" polymer being situated at the wall of the reactor. However, this can present a problem if it persists since it means that a solid insulating layer is formed at the walls of the reactor. If this layer continues to grow, it can quickly transform into a reactor sheet. This phenomenon is referred to as "cold bands." It has been found that cold bands are often associated with the adherence of small polymer particles or "fines" to the wall of the reactor. Fines are generally defined as the percentage of the total distribution of particles passing through a 120 mesh standard sieve. This has a particle size equivalent of 120 microns. Fines are important since high levels can lead to sheeting, fouling of the reactor cycle gas system and fouling of the heat exchanger distributor plate requiring a reactor shut down to clean out.

Standard Fluidized-Bed Polymerization Conditions

The polymerization was conducted in a continuous gas phase fluidized bed reactor. The fluidized bed is made up of polymer granules. The gaseous feed streams of ethylene and hydrogen together with liquid comonomer (hexene) were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a desired ethylene partial pressure, typically about 200 to 220 psi. The hydrogen partial pressure was controlled to maintain a constant hydrogen to ethylene mole ratio. The concentration of all the gases was measured by an on-line gas chromatograph to confirm the desired composition in the recycle gas stream.

The catalysts were injected directly into the fluidized bed as a dry powder from a shot feeder, entering the reactor at about the 2 ft level with nitrogen gas carrier assist. The rate of catalyst injection was adjusted to maintain a constant production rate. The reacting bed of growing polymer particles was maintained in a fluidized state by the continuous flow of the make up feed and recycle gas through the reaction zone. A superficial gas velocity of about 2.1 to 2.4 ft/sec was used to achieve this. The reactor was operated at a total pressure of about 265 psig. To maintain a desired reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which is simultaneously vented back to the reactor. This allows for highly efficient removal of the product, while at the same time recycling a large portion of the unreacted gases back to the reactor. The product was purged to remove entrained hydrocarbons and treated with a small stream of humidified nitrogen to deactivate any trace quantities of residual catalyst.

A static voltage probe was located at about the 1.5-foot level. The reactor was equipped with twenty-six thermocouples mounted on the external surface of the reactor and expanded section. These were monitored continuously using a Honeywell TDC 3000 process computer. The skin thermocouples were located at about the plate (about 2 inches above the plate), 1 foot, 2 feet, 3 feet, 5 feet, 8 feet, and cone. All skin thermocouples except the cone extended about ⅛ inch into the bed. The cone skin thermocouple was flush with the reactor wall and was located exactly at the halfway point in the cone.

Experimental

As noted above, the fluidized bed reactor was started with a silylchromate-on-silica catalyst system which produces a product having a flow index (FI) of 8 and a density of 0.942 g/cc. Typical reaction conditions for the production of DSX-4208H were: a temperature of 92–93 C., a total pressure within the reactor of 265 psig, an ethylene partial pressure of 208 psi, a hydrogen to ethylene ($H_2/C_2$) partial pressure ratio of 0.051, a hexene (comonomer) to ethylene ($C_6/C_2$) partial pressure ratio of 0.0081, a superficial gas velocity of 2.18 ft/sec, a fluidized bulk density of 30 lb/ft$^3$, a production rate of polymer of from 9,000 to 10,000 lb/hr and an ash content of 0.025 to about 0.056 wt %. There was rather intense static during this run which carried over into the beginning of the MDCC run.

The S-2 UCAT G-150 catalyst was stopped and the reaction was allowed to die for 6 hours while maintaining reactor conditions. This was done to reduce catalyst inventory in the bed as much as possible. There was essentially no sign of reaction after five hours based on the reactor temperature differential.

Oxygen was injected for 30 minutes through an $O_2$ addback system to kill the remaining catalyst. The feed rate was at least 0.05 pounds per hour (pph) of a 7.5 weight percent oxygen in nitrogen mixture. It is believed, however, that the first 25 minutes of oxygen feed to the reactor essentially failed to make it into the reactor system. This is because the oxygen feed point was to the main ethylene supply manifold downstream of the main ethylene supply valve. The main ethylene supply manifold was connected directly to the cycle gas line below the bottom head but there was no ethylene flow to sweep the oxygen in because the ethylene valve was closed. There was still about 3000 pph of ethylene flow to the reactor but this was to the taps that was supplied from a point upstream of the main ethylene supply valve (and downstream of the flow indicator). The situation was recognized and remedied after 25 minutes of oxygen feed by slightly opening the ethylene supply valve. This was the point in time that oxygen actually went into the reactor. There was perhaps a barely perceptible decrease in the reactor temperature differential but this could have been attributable to the instrument or a result of the small amount of fresh ethylene introduced with the oxygen to the cycle line. Oxygen add-back was continued for another 5 minutes for 30 minutes total. There was no change in static or skin thermocouples during this time.

The reactor was blown-down when the oxygen feed was stopped and was then purged with ethylene for 2 hours at 4,000 lbs/hr to achieve five gas volume change-outs (turnovers) of ethylene. The temperature was about 76° C. and the ethylene partial pressure was about 70 to 84 psi. Higher temperatures could not be maintained in the absence of reaction and at reduced reactor pressure. The bed level was about 33 to 34 ft during this time.

Then mixed catalyst system reactor conditions were established except for the reaction temperature, which remained at about 78° C. and was held at this point until catalyst feed was begun. Once catalyst feed was achieved, the reaction began very quickly and was established within about 5 to 15 minutes.

After the mixed catalyst feed started, the static was in a broad band with some positive spikes but essentially zeroed within about 24 hours. The four 5 ft. skin thermocouples were initially depressed by −15 to −20° C. but returned to about −2 to −3 C within about four hours of starting catalyst feed. The four expanded section skin thermocouples were about −8 to −10° C. going into the transition and remained there through the transition and throughout the mixed catalyst system run.

There was a marked decrease in the resin fluidized bulk density over the next three bed turnovers and the bed weight was systematically decreased from 40,000 to 27,000 lbs to maintain the bed level just below the start of the transition section.

EXAMPLE 2

Reactor and Equipment

The following example was conducted in a fluidized bed reactor starting with a metallocene catalyst system and running transition to a silyl-chromate catalyst system.

Experimental indicators of operability problems utilize the measurement of temperatures which exist at the wall of the reactor. The temperature was measured using thermocouples known in the art as "skin thermocouples" since they measure temperature close to the reactor wall. Typically, the skin thermocouples are 5°–10° F. (1°–4° C.) below the internal bed temperature. Deviations from the baseline are indicative of reactor operability problems. These deviations can be either positive or negative.

Positive skin thermocouple deviations are the result of reactor sheeting due to a run away reaction at the wall of the reactor. If the internal bed temperature increases to the point at which the melting point of the polymer is attained, a solid strip of polymer is formed and dislodged to the main body of the reactor resulting in severe operability problems. In many cases; several hours to days of a reactor shut down are required to remove the sheets before restarting the polymerization process.

Negative skin thermocouple deviations are less serious since this is representative of "cold" polymer being situated at the wall of the reactor. However, this can present a problem if it persists since it means that a solid insulating layer is formed at the walls of the reactor. If this layer continues to grow, it can quickly transform into a reactor sheet. This phenomenon is referred to as "cold bands." It has been found that cold bands are often associated with the adherence of small polymer particles or "fines" to the wall of the reactor. Fines are generally defined as the percentage of the total distribution of particles passing through a 120 mesh standard sieve. This has a particle size equivalent of 120 microns. Fines are important since high levels can lead to sheeting, fouling of the reactor cycle gas system and fouling of the heat exchanger distributor plate requiring a reactor shut down to clean out.

Standard Fluidized-Bed Polymerization Conditions

The polymerization was conducted in a continuous gas phase fluidized bed reactor. The fluidized bed is made up of polymer granules. The gaseous feed streams of ethylene and hydrogen together with liquid comonomer (hexene) were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a desired ethylene partial pressure, typically about 200 to 220 psi. The hydrogen partial pressure was controlled to maintain a constant hydrogen to ethylene mole ratio. The concentration of all the gases was measured by an on-line gas chromatograph to confirm the desired composition in the recycle gas stream.

The catalysts were injected directly into the fluidized bed as a dry powder from a shot feeder, entering the reactor at about the 2 ft level with nitrogen gas carrier assist. The rate of catalyst injection was adjusted to maintain a constant production rate. The reacting bed of growing polymer particles was maintained in a fluidized state by the continuous flow of the make up feed and recycle gas through the reaction zone. A superficial gas velocity of about 2.1 ft/sec was used to achieve this. The reactor was operated at a total pressure of about 265 psig. To maintain a desired reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which is simultaneously vented back to the reactor. This allows for highly efficient removal of the product, while at the same time recycling a large portion of the unreacted gases back to the reactor. The product was purged to remove entrained hydrocarbons and treated with a small stream of humidified nitrogen to deactivate any trace quantities of residual catalyst.

A static voltage probe was located at about the 1.5-foot level. The reactor was equipped with twenty-six thermocouples mounted on the external surface of the reactor and expanded section. These were monitored continuously using a Honeywell TDC 3000 process computer. The skin thermocouples were located at about the plate (about 2 inches above the plate), 1 foot, 2 feet, 3 feet, 5 feet, 8 feet, and cone. All skin thermocouples except the cone extended about ⅛ inch into the bed. The cone skin thermocouple was flush with the reactor wall and was located exactly at the halfway point in the cone.

Experimental

As noted above, the fluidized bed reactor was started with a metallocene catalyst system (a Bis Cp $ZrCl_2$ catalyst with MAO as activator). Typical reaction conditions were: a temperature of 94–95° C., a total pressure within the reactor of 249–265 psig, an ethylene partial pressure of 208–230 psi, a hydrogen to ethylene ($H_2/C_2$) mole ratio of 0.00007–0.025, a hexene (comonomer) to ethylene ($C_6/C_2$) concentration ratio of 0.0045–0.0060, a superficial gas velocity of 1.9–2.1 ft/sec, a fluidized bulk density of 19–21 lb/ft$^3$, a production rate of polymer of from 5,700 to 9,200 lb/hr and an ash content of 0.031 to 0.065 wt %.

The metallocene catalyst was stopped and the reaction was allowed to die for 2.5 hours while maintaining reactor conditions for the metallocene reaction. The reaction was dead in 2.5 hours as noted by a 5° C. temperature drop and a reduction in production rate to 1000 pph. The $C_6/C_2$ mole ratio was reduced from metallocene's 0.020 to about 0.005 with the aid of a blowoff during the die-off of the metallocene reaction. The hydrogen concentration was held at 150 ppm.

Once the metallocene reaction had died-off, the reactor temperature was raised from 85° C. to about 90° C. and the silylchromate-on-silica catalyst feed was started 3 hours and 10 minutes after discontinuing the metallocene catalyst feed. The hydrogen remained at about 150 to 170 ppm initially on $H_2/C_2$ flow ratio control and then with no hydrogen addition for the first bed turnover (BTO) of silylchromate-on-silica catalyst operation to ensure there was no reactivation of the metallocene by hydrogen. The silylchromate-on-silica catalyst reaction initiated almost immediately after starting the S-2 catalyst feed at a feed rate target of 2 pph.

The reaction was maintained at 90° C. for one bed turnover (BTO) and was then increased stepwise to 95° C., the target temperature for the silylchromate-on-silica catalyst, in increments of 0.5 to 1° C. with each half to 1 bed turnover so as to prevent agglomeration of the low-density metallocene transition bed.

While the present invention has been described and illustrated by reference to particular embodiments, it will be appreciated by those of ordinary skill in the art that the invention lends itself to variations not necessarily illustrated herein. For example, it is not beyond the scope of this invention to transition between one or more mixed catalysts to one or more incompatible mixed catalysts and vice-versa. For this reason, then, reference should be made solely to the appended claims for purposes of determining the true scope of the present invention.

What is claimed is:

1. A process for transitioning from a first polymerization reaction conducted in the presence of a first catalyst system to a second polymerization reaction conducted in the presence of a second catalyst system, the polymerization reaction being conducted in a polymerization zone of a gas phase fluidized bed reactor which contains a fluidized bed of polymer particles by the essentially continuous passage of monomer gases comprising ethylene through the polymerization zone, comprising:
   a) discontinuing the introduction of the first catalyst system into the reactor wherein the first catalyst system comprises a chrome-based catalyst system and allowing the reactor temperature to drop to or below 80° C.;
   b) maintaining polymerization conditions in the reactor and permitting polymerization to continue for a period of time to allow the components of the first catalyst system present in the reactor to produce additional polymer particles;
   c) establishing appropriate conditions within the reactor for the second catalyst system, wherein the second catalyst system comprises a mixed catalyst system comprising a metallocene component;
   f) introducing the second catalyst system into the reactor; and
   g) increasing reactor temperature to 105° C. essentially simultaneously with the commencement of the second polymerization reaction.

2. The process of claim 1 wherein after discontinuing the introduction of the first catalyst system into the reactor, a deactivating agent for the first catalyst system is introduced into the reactor to inhibit the first polymerization reaction.

3. The process of claim 2 wherein the deactivating agent is selected from the group consisting of oxygen, alcohols, glycols, phenols, ethers, ketones, aldehydes, and carboxylic acids.

4. The process of claim 3 wherein the deactivating agent comprises oxygen.

5. The process of claim 2 wherein after the introduction of the deactivation agent and before the introduction of the second catalyst system into the reactor the partial pressure of ethylene in the reactor is reduced to about 60 to about 85 psig.

6. The process of claim 5 wherein after the reduction of the partial pressure of ethylene in the reactor, the reactor is purged with ethylene to achieve at least five gas volume change outs of the reactor.

7. The process of claim 1 wherein the monomer gas comprises ethylene.

8. The process of claim 7 wherein the monomer gas further comprises at least one higher alpha olefin monomers.

9. The process of claim 1 wherein the components of the first catalyst system present in the polymerization zone are permitted to produce additional polymer for a period of up to 10 hours after discontinuing the introduction of the first catalyst system into the polymerization zone.

10. The process of claim 9 wherein the components of the first catalyst system present in the polymerization zone are permitted to produce additional polymer for a period of 6 hours after discontinuing the introduction of the first catalyst system into the polymerization zone.

11. The process of claim 1 wherein the second catalyst system is not introduced into the reactor until after essentially all of the first catalyst system has been consumed in the course of the first polymerization reaction.

12. The process of claim 1 wherein the transition comprises less than or equal to 5 volume turnovers of ethylene.

13. The process of claim 1 wherein the metallocene component comprises a cationic moiety.

14. A process for transitioning from a first polymerization reaction conducted in the presence of a first catalyst system to a second polymerization reaction conducted in the presence of a second catalyst system, the polymerization reaction being conducted in a polymerization zone of a gas phase fluidized bed reactor which contains a fluidized bed of polymer particles by the essentially continuous passage of monomer gases through the polymerization zone, comprising:
  a) discontinuing the introduction of the first catalyst system into the reactor wherein the first catalyst system comprises a metallocene catalyst system and allowing the reactor temperature to drop or below 80° C.;
  b) maintaining polymerization conditions in the reactor and permitting polymerization to continue for a period of time to allow the components of the first catalyst system present in the reactor to produce additional polymer particles;
  c) establishing optimal appropriate conditions within the reactor for the second catalyst system, wherein the second catalyst system comprises a silyl-chromate catalyst system;
  d) introducing the second catalyst system into the reactor; and
  e) increasing reactor temperature to 95° C.

15. The process of claim 14 wherein the monomer gas comprises ethylene.

16. The process of claim 15 wherein the monomer gas further comprises at least one higher alpha olefin monomers.

17. The process of claim 14 wherein the components of the first catalyst system present in the polymerization zone are permitted to produce additional polymer for a period of up to 8 hours after discontinuing the introduction of the first catalyst system into the polymerization zone.

18. The process of claim 17 wherein the components of the first catalyst system present in the polymerization zone are permitted to produce additional polymer for a period of 2.5 hours after discontinuing the introduction of the first catalyst system into the polymerization zone.

19. The process of claim 14 wherein the second catalyst system is not introduced into the reactor until after essentially all of the first catalyst system has been consumed in the course of the first polymerization reaction.

* * * * *